(12) United States Patent
Reilly

(10) Patent No.: X7454
(45) Date of Patent: Feb. 28, 1833

(54) SHAVING LEATHER

(76) Inventor: James Reilly

James Reilly, of Waynesboro', Penn.a
Letters Patent

The schedule referred to in these Letters Patent and making part of the same, containing a description in the words of the said James Reilly himself, of his improvement, being a machine for Shaving Leather –

---

Be it known that I James Reilly of Waynesboro', Franklin County, and State of Pennsylvania, have made an improvement in the useful arts being a machine for shaving leather, which is described as follows. This machine consists of the following principal parts: viz: The frame which encloses and supports the work: the cylinder for drawing the leather. The knife spring and head block for cutting the leather: the roller for guiding the leather, the cams and lever for raising the head block by which the taper thickness is cut off the leather. The frame is constructed by keying or in any other way, fastening together two end pieces, two side pieces, and one intermediate piece of strong timber, of a size and shape adapted to receive the other parts of the machine to be hereafter described.

The Cylinder for drawing the leather is made of wood, of about 3 inches diameter, in the centre part; it turns on axles in the frame: on one axle is a projection of about half inch diameter, on which a cord to be hereafter described is wound; and on the other is a projection of the axle to receive a crank; upon this cylinder is fastened a piece of leather with hooks, to which is attached the leather to be shaved.

The Head block is made of wood, covered with metal, forming a gently sloping ridge, where the knife comes, and is adapted to it. Below the head block is a cylinder of wood on which is fixed two cams or taper irons for raising the head block: this cylinder also turns on gudgeons in the frame, and one end is prolonged to receive the end of a lever to which a cord is attached, passing round the axle of the main cylinder, and by which the cam cylinder is turned. The knife is made of steel, and brought to a sharp edge; it is fastened by a screw bolt at each side to the frame and is brought to a feather edge on the headblock.

A Spring at each end of the knife, and connected by a small bar is fas-
tened down on the head block by the screws of the knife, it serves to press
down the leather to prevent its being cut off by the knife.
A roller. is placed behind the knife for guiding the leather to the main
cylinder — Operation. the leather to be shaved passes under the guide
roller over the head block, and under the knife, and is hooked to the leather
on the main cylinder: The main cylinder is then turned by the crank handle
which causes the leather to be drawn forward between the knife and head
block, and thus shaved, at the same time the cam cylinder is turned by
the cord and lever on its axle, the cord winding on the small end of the
main cylinder: thus cutting the leather Tapering which is particularly
required for covering whips. By raising or lowering the two screws under
the knife the leather is cut to any thickness —
The invention here claimed and desired to be secured by Letters Patent;
is the before described machine for shaving leather — particularly the sli-
-ding head block, and cam cylinder; and mode of turning it also the spring.
For a further illustration of my invention, I refer to the model and drawing
of the same deposited in the patent office — In Testimony whereof. I have
hereunto subscribed my name this 20th day of February 1833.

Witnesses
Chs. M. Keller
H. P. Elliot

James Reilly

Exd.
[illegible]

[illegible]